United States Patent [19]

Fodor

[11] 4,080,407

[45] Mar. 21, 1978

[54] RESINOUS LINEAR COPOLYMERS HAVING BLOCKS WITH A HETEROGENEITY INDEX OF 2.3 TO 4.5

[75] Inventor: Lawrence M. Fodor, Bartlesville, Okla.

[73] Assignee: Phillips Petroleum Company, Bartlesville, Okla.

[21] Appl. No.: 630,608

[22] Filed: Nov. 10, 1975

[51] Int. Cl.$^2$ .......................................... C08F 297/04
[52] U.S. Cl. ............................. 260/880 B; 260/876 B
[58] Field of Search ......................... 260/880 B, 876 B

[56] References Cited

U.S. PATENT DOCUMENTS

| | | | |
|---|---|---|---|
| 3,281,383 | 10/1966 | Zelinski | 260/880 B |
| 3,507,934 | 4/1970 | Minor | 260/876 |
| 3,560,593 | 2/1971 | Hsieh | 260/880 B |
| 3,639,517 | 2/1972 | Kitchen | 260/879 |
| 3,954,696 | 5/1976 | Roest | 260/880 B |

*Primary Examiner*—Paul R. Michl

[57] ABSTRACT

A resinous linear block copolymer of a monovinyl substituted aromatic compound and a conjugated diene wherein the polymerized monovinyl substituted aromatic compound blocks have a heterogeneity index within the range of about 2.3 to 4.5. The heterogeneity index is the ratio of weight average to number average molecular weight. Such compositions exhibit high impact strength and can be made either by blending two linear block copolymers made under different conditions so as to give different lengths of the polymerized monovinyl substituted aromatic compound blocks, or by adding the monovinyl substituted aromatic compound and a polymerization initiator in two or more increments prior to adding the conjugated diene.

18 Claims, No Drawings

RESINOUS LINEAR COPOLYMERS HAVING BLOCKS WITH A HETEROGENEITY INDEX OF 2.3 TO 4.5

BACKGROUND OF THE INVENTION

This invention relates to high impact resinous linear copolymers of a monovinyl substituted aromatic compound and a conjugated diene.

It is well known to produce impact polystyrene by blending a rubber with the polystyrene. This results in improvement in the impact of the polystyrene with a substantial sacrifice with respect to other properties. It is also known that some but not all radial block copolymers exhibit high impact strength, see for instance Kitchen et al U.S. Pat. No. 3,639,517.

It would be desirable to achieve a linear polymer having high impact strength without the disadvantages associated with rubber reinforced polystyrene.

SUMMARY OF THE INVENTION

It is an object of this invention to provide high impact linear block copolymers of a monovinyl substituted aromatic compound and a conjugated diene.

In accordance with this invention there is provided a linear monovinyl substituted aromatic compound/conjugated diene block copolymer composition characterized by a heterogeneity index of blocks of polymerized monovinyl substituted aromatic compound within the range of about 2.3 to 4.5, preferably 2.4 to 4.5.

DESCRIPTION OF THE PREFERRED EMBODIMENTS

It has been found that high impact strength is associated with a lamellar morphology. Samples having a heterogeneity index of the monovinyl substituted aromatic compound block of less than 2.3 tend to have a morphology characterized by spheres of the polymerized diene embedded in a continuum of polystyrene. On impact the polystyrene phase takes most of the load and hence low impact values are obtained whereas with the lamellar configuration there are alternating layers of polymerized styrene blocks and polymerized diene blocks which act in a reinforcing manner. With a heterogeneity index of greater than about 4.5 the morphology is inverted with spheres or ellipsoids of polymerized monovinyl substituted aromatic compound being found in a continuum of polymerized diene. This structure gives a cheesy (weak and crumbly) product. This change in properties above a heterogeneity index of 4.5 may also be affected by incompatibility due to great variations in the molecular weights of the blocks.

Thus in accordance with the invention there is provided linear block copolymer compositions having a heterogeneity index within the range of about 2.3 to 4.5 for the polymerized monovinyl substituted aromatic component blocks.

The heterogeneity index is the ratio of weight average to number average molecular weight and is expressed by the formula $$HI = \frac{\overline{M_w}}{\overline{M_n}} = \frac{\left(\frac{W_1 S_1 M_{S1} + W_2 S_2 M_{S2}}{W_1 S_1 + W_2 S_2}\right)}{\left(\frac{N_1 M_{S1} + N_2 M_{S2}}{N_1 + N_2}\right)}$$

where:
$W$ is the weight of fraction (1 = major, 2 = minor)
$S$ is styrene content of the fraction
$N$ is moles styrene blocks in fraction
$M_S$ is molecular weight of styrene block in fraction.

The weight average and number of average molecular weights used in the above formula are calculated assuming monodispersity, which is a reasonable approximation since the molecular weight distribution of each polymer produced is extremely narrow. Then the number of moles of initiator is divided into the number of grams of monomer to give grams of polymer per mole or the number average molecular weight which is essentially the same as the weight average molecular weight.

Past experience based on actually digesting a copolymer in peroxide to leave only the polymerized styrene block which was then analyzed using gel permeation chromatography has shown the calculated values to agree closely with the measured values.

As an example of the calculations the following is a calculation of the HI for Run 1 of Table II B:

$M_{S1} = 75 \times 10^3$ $M_{S2} = 17 \times 10^3$ $W_1 = 0.58$ $W_2 = 0.42$ $S_1 = (75 \times 10^3)/(87 \times 10^3) = 0.862$ $S_2 = (17 \times 10^3)/(29 \times 10^3) = 0.586$ $N_1 = (0.862 \times 58)/(75 \times 10^3) = 0.667 \times 10^{-3}$ $N_2 = (0.586 \times 42)/(17 \times 10^3) = 1.45 \times 10^{-3}$ $$HI = \frac{\frac{.58 \times .862 \times 75 \times 10^3 + .42 \times .586 \times 17 \times 10^3}{.58 \times .862 + .42 \times .586}}{\frac{.667 \times 75 \times 10^3 + 1.45 \times 17 \times 10^3}{.667 + 1.45}}$$

$$= \frac{\frac{(37.50 + 4.18) \times 10^3}{.50 + .246}}{\frac{(50.02 + 24.65) \times 10^3}{2.112}} = \frac{\frac{41.68 \times 10^3}{.746}}{\frac{74.67 \times 10^3}{2.112}} = \frac{55.87 \times 10^3}{35.36 \times 10^3} = 1.58$$

Although the formula is directed to the combination of two polymers either blended together or produced in situ, it should be noted that three or more polymers can be used. The expression as well as the following preparative methods encompass such expansion. The block copolymers of this invention are produced from a monovinyl substituted aromatic compound and a conjugated diene.

Suitable monovinyl substituted aromatic compounds are those containing 8 to 18 carbon atoms per molecule. Examples of suitable compounds include styrene, 3-methylstyrene, 4-n-propylstyrene, 4-cyclohexylstyrene, 4-decylstyrene, 2-ethyl-4-benzylstyrene, 4-p-tolylstyrene, 4-(4-phenyl-n-butyl)styrene, 1-vinylnaphthalene, 2-vinylnaphthalene, and the like and mixtures thereof. Styrene is the preferred monovinyl substituted aromatic compound and for the sake of simplicity the invention hereinafter will be described in terms of utilizing styrene, it being understood that the invention is not limited to the use of styrene as the monovinyl-substituted aromatic compound.

Suitable conjugated dienes or mixtures thereof that can be used in this invention include those having 4 to 12 carbon atoms per molecule, those containing 4 to 8 carbon atoms being preferred. Exemplary of suitable compounds are 1,3-butadiene, isoprene, 2,3-dimethyl-1,3-butadiene, piperylene, 3-butyl-1,3octadiene, and the like. The preferred diene is 1,3-butadiene and the invention hereinafter will be described in terms of butadiene, it being understood that butadiene hereinafter is referred to as exemplary only and the invention is not intended to be limited thereto.

The polymerization initiators employed according to this invention are well known in the art and can be broadly depicted as organolithium initiators. Those preferred are hydrocarbyl monolithium compounds and can be represented by the formula RLi where R is a hydrocarbon radical selected from aliphatic, cycloaliphatic, or aromatic radicals containing from about 1 to 20 carbon atoms per molecule. Exemplary initiators suitable for use according to this invention include: n-butyllithium, sec-butyllithium, methyllithium, phenyllithium, naphthyllithium, p-tolyllithium, cyclohexyllithium, eicosyllithium, and the like. Because it is particularly effective, n-butyllithium is presently preferred.

Polymerization is carried out by initially adding styrene and initiator which results in the formation of polymerized styrene blocks having a terminal lithium atom. Thereafter if additional styrene and initiator are added new polymerized styrene blocks are begun utilizing part of the newly added styrene with the remainder serving to increase the length of the existing polymerized styrene blocks. Thereafter butadiene is added which forms a block of polymerized butadiene between the polymerized styrene block and the terminal lithium atom. At this point additional styrene can be added to complete the polymer by forming a polymerized styrene block between the polymerized butadiene and the terminal lithium atom to give styrene-butadiene-styrene. Alternatively a difunctional coupling agent can be added so as to couple two of the styrene-butadiene blocks to give styrene-butadiene-butadiene-styrene. Difunctional coupling agents are known in the art and any of these known coupling agents can be utilized. Suitable difunctional coupling agents include the diisocyanates, diimines (diaziridinyl), dialdehydes, dihalides, and the like. Exemplary compounds are: benzene-1,4-diisocyanate; naphthalene-2,6-diisocyanate; naphthalene-1,3-diisocyanate; di(1-aziridinyl)ethyl phosphine oxide; di(2-phenyl-1-aziridinyl)propyl phosphine oxide; di(2,3-dimethyl-aziridinyl)hexyl phosphine sulfide; 1,4-naphthalene dicarboxyaldehyde; 1,9-anthracene dicarboxyaldehyde; 2,4-hexanedione; 1,10-anthracenedione; dichlorodiethylsilane; dibromodibutylsilane; difluorodicyclohexylsilane; di-n-hexyldifluorotin; diphenyldibromotin; diethyldiallyltin; dicyclohexyldichlorotin; didodecylchlorobromotin; di(3-methylphenyl)chloroallyltin; and the like.

Another suitable difunctional treating agent is carbon dioxide.

The preferred difunctional coupling agents are esters of the formula

which are believed to react as follows:

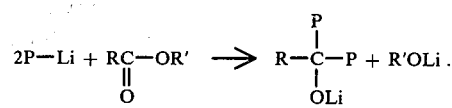

R and R' are preferably 1 to 6 carbon alkyl radicals. Most preferred is ethyl acetate.

The final block copolymer compositions of this invention contain 50 to 95 weight percent polymerized monovinyl-substituted aromatic component and exhibit a falling dart impact strength of greater than 20 in.-lbs. (2.2 joules), preferably greater than 25 in.-lbs. (2.8 joules). The separate constituents of the final composition also individually contain 50 to 95 weight percent polymerized monovinyl substituted aromatic component but have a lower impact strength. The term resinous is used in a conventional sense to mean a normally solid material not having rubbery properties. Generally such materials will have a Shore D hardness of greater than 62, generally greater than 65.

The compositions of this invention can, of course, contain conventional additives such as antioxidants, UV stabilizers, fillers, pigments, and the like.

The compositions of the invention can be produced by three techniques. In each instance sufficient time is allowed after the introduction of each monomer for the substantially complete polymerization thereof before the addition of the next monomer.

Technique one encompasses multiple sequential addition of monomers and catalyst and no coupling is involved. The order of addition of components is styrene, initiator; initiator, styrene; butadiene; styrene (neglecting charging of solvent, modifier, etc.). Linear, block copolymers are prepared. By regulating the quantity of styrene (S) charged in each increment as well as quantity of butadiene (B) charged, a mixture of polymers is formed in situ of $S_1$-$S_2$-B-$S_3$ and $S_2$-B-$S_3$, which in combination satisfy the required HI index. Each subscript refers to a separately charged styrene increment.

Technique two encompasses multiple sequential addition of monomers and initiator and coupling of the resulting products with a difunctional coupling agent (X) to obtain a mixture of linear polymers represented as $S_1$-$S_2$-B-X-B-$S_2$-$S_1$, $S_1$-$S_2$-B-X-B-$S_2$ and $S_2$-B-X-B-$S_2$ which taken together satisfies the required HI index. The order of addition, neglecting solvent and modifier, is styrene, initiator; initiator, styrene; butadiene; coupling agent.

Technique three encompasses in the first instance mixing two or more difunctionally coupled styrene-butadiene diblock copolymers, each coupled polymer separately prepared, to obtain a final blend which satisfies the required HI index or in the second instance mixing two or more separately prepared block copolymers prepared by multiple addition of styrene and initiator. The blend, using previous terminology, can be represented as a mixture of $S_1$-$B_1$-X-$B_1$-$S_1$ and $S_2$-$B_2$X-$B_2$-$S_2$ in the first instance, or $S_1$-$S_2$-$B_1$-$S_3$ plus $S_2$-$B_1$-$S_3$ and $S_4$-$S_5$-$B_2$-$S_6$ plus $S_5$-$B_2$-$S_6$ in the second instance, where $B_1$ and $B_2$ represent butadiene blocks of different molecular weights. However, the difference in number molecular weights of the butadiene blocks preferably should not exceed about 10,000 in order to obtain the proper morphology. The order of addition in each reactor in the first instance, neglecting solvent and modifier, is styrene, initiator; butadiene; coupling agent. In the second instance it is styrene, initiator; initiator, styrene;

butadiene; styrene. The polymer solutions are then combined and mixed before recovering the final product. Alternately, polymers previously recovered can be blended together by suitable means (roll mills, etc.).

It is also within the scope of this invention to mix a polymer prepared by means of technique one with one prepared by technique two or technique three and a polymer prepared by technique two with one of technique three to obtain a final blend which satisfies the required HI index range.

A general method of preparation of the various polymers, subject to the limitations of this invention, is described in U.S. Pat. No. 3,639,517 in which sequential polymerization of styrene or other monovinyl-substituted aromatic hydrocarbon and butadiene or other conjugated diene is employed.

The quantities of each component used in the polymerizations are given in the following Table I A.

Table I A

Preparation of Linear, Multiple Sequential Addition Copolymers

| Run No. | $C_yC_6$ ($cm^3$) | S Component | | | | | | Effective BuLi[a] | | THF (g) | B Component | |
|---|---|---|---|---|---|---|---|---|---|---|---|---|
| | | First | | Second | | Third | | First | Second | | | |
| | | (g) | ($cm^3$) | (g) | ($cm^3$) | (g) | ($cm^3$) | ($cm^3$) | ($cm^3$) | | (g) | ($cm^3$) |
| 1 | 485 | 30 | 33 | 10 | 11 | 10 | 11 | 0.61 | 1.64 | 0.017 | 17 | 28 |
| 2 | 485 | 30 | 33 | 10 | 11 | 10 | 11 | 0.61 | 1.70 | 0.067 | 17 | 28 |

Notes:
The THF was added as a solution in cyclohexane containing 0.034 g solute per $cm^3$ solvent. A duplicate run was made identically to run 2 and the polymer solutions combined at the termination of the polymerization.
The stabilizer system added to each polymer solution consisted of 1.5 phm tri(mixed mono- and dinonylphenyl) Phosphite (Wytox 312, Stepan Chemical Co.) and 0.5 phm 2,6-di-t-butyl-4-methylphenol contained in cyclohexane.
[a]Slightly more than this was used depending on the measured catalyst poisons. The effective amount is the cc of the solution used in addition to a small amount needed to scavenge poisons.

EXAMPLE 1

Polymers made according to technique one, previously described, were prepared by conducting each polymerization in 32 ounce (0.95 liter) glass beverage bottles. In each run, the following materials were added to the bottle, while under nitrogen, in the order shown:
1. cyclohexane ($Cyc_6$), then first increment of styrene (S)
2. purge 5 minutes with nitrogen, cap and fill with nitrogen
3. tetrahydrofuran (THF)
4. first initiator charge, n-butyllithium (BuLi), 0.023 g/$cm^3$ in cyclohexane
5. react at 60° C. for 30 minutes (60 minutes in run 2)
6. second initiator charge
7. second increment of styrene
8. react at 60° C. for 15 minutes (60 minutes in run 2)
9. butadiene (B)
10. react at 60° C. for 30 minutes (60 minutes in run 2)
11. third increment of styrene
12. react at 60° C. for 30 minutes (60 minutes in run 2)
13. stabilizer system, 2 parts by weight per 100 parts by weight monomer (phm)

After the stabilizer system was mixed with the polymer solution, each solution was devolatilized in a vacuum oven at 100° C. and the resulting dried product was milled on a roll mill at 285° F. (140° C.) for 3 minutes, after banding commenced, to further homogenize and densify the sample.

The melt flow, glass transition temperature (Tg) (by differential thermal analysis, DTA), falling dart impact strength, elongation, dynamic modulus and loss was determined, when applicable, for each sample. The melt flow was determined in accordance with ASTM D1238-62T at 200° C. and a 5 kg load. Tg was determined by DTA using a DuPont Thermal Analyzer, Model 900, equipped with a DSC cell. Dart impact strength was ascertained by noting the height in inches at which a free falling bullet-shaped brass dart weighing 1.123 lbs (0.059 kg) impacting a test sample broke 2 out of 4 samples tested at that height. The samples were made by injection molding slabs having the dimensions $1\frac{1}{4} \times 1\frac{3}{4} \times 0.100$ inch (3.2 cm × 4.4 cm × 0.25 cm). Each slab was positioned so that it was supported around its perimeter during the impact test and each sample was tested only once. The dynamic modulus and loss values were determined by means of a Vibron Direct Reading Viscoelastometer, Model DVV-II (Toyo Instruments Co., Tokyo, Japan). The Vibron experiments were made on test samples cut from compression molded film having dimensions about $\frac{1}{8}$ inch wide (0.05 cm), 1.2 inches long (3 cm) and about 10 mils (0.025 cm) in thickness. Each test sample was measured at 35 Hz at temperatures ranging from about −100° C. to about 20° C. The physical properties of each polymer sample and the test results are given in the following Table I B.

Table I B

Properties of Linear, Multiple Sequential Addition Copolymers

| Run No. | Melt Flow (g/10 min) | High MW Fraction Block MW[a] × $10^{-3}$ | | | Wt. % | Low MW Fraction Block MW × $10^{-3}$ | | | Wt. % | Calculated Styrene Block, HI | Vibron Results Tan δ Max. | T° C (Tan δ) Max. | Test Angle Degrees | Tg (° C) | Falling Dart Impact (in-lbs) | Joules | Elong % | Remarks |
|---|---|---|---|---|---|---|---|---|---|---|---|---|---|---|---|---|---|---|
| | | S | B | S | | S | B | S | | | | | | | | | | |
| 1 | 5.6 | 148 | 21 | 12 | 60 | 12 | 21 | 12 | 40 | 3.3 | 0.066 | −80 | 90 | nd[b] | nd | nd | nd | invention |
| 2 | 5.9 | 148 | 21 | 12 | 60 | 12 | 21 | 12 | 40 | 3.3 | nd | nd | nd | −83 | 68.5 | 7.74 | 155 | invention |
| 3[c] | 6 | 56 | 19 | na[d] | 100 | — | — | — | — | 1.0 | 0.027 | −93 | 90 | nd | <10 | <1.1 | nd | control |
| 4[e] | 6 | 139 | 11 | — | 62 | 11 | 11 | — | 38 | 3.0 | 0.149 | −78 | 90 | nd | 53.0 | 5.15 | nd | control |

[a]Block molecular weight calculated by dividing monomer weight in grams by moles of effective BuLi.
[b]Not determined.
[c]Polymer formed with single addition of styrene and initiator prior to adding butadiene and then coupled with a coupling agent having at least three reactive sites.
[d]Not applicable.
[e]Radial polymer made with multiple addition of styrene and initiator.

As can be seen, invention Run 2 representing the invention had a high impact strength similar to that of the best of the radial polymers as exemplified by control Run 4, and much better than that of ordinary radial polymer as exemplified by control Run 3. Impact was not determined on invention Run 1, however the temperature of tangent δ max was −80° C. which is a value associated with good impact as will be discussed in more detail in the discussion following Table III C. Thus these data shown surprisingly that linear polymer produced by multiple addition of initiator and styrene, having a heterogeneity index of the polymerized styrene blocks within the range of about 2.3 to 4.5 has an impact strength as good as or better than the best radial polymer. Runs 3 and 4 contained 76 percent polymerized styrene and Runs 1 and 2 75 percent, i.e., they were essentially equal.

EXAMPLE II

Polymers made according to technique two, previously described, were prepared by conducting a series of individual polymerizations with variable quantities of monomers and coupling the resulting polymers with ethyl acetate as an example of a difunctional coupling agent. Each polymerization of the first 9 runs was conducted in a 32 ounce (0.95 liter) glass beverage bottle. Each component used was added to the bottle in a nitrogen atmosphere. Preparation details are given in Table II A.

Table II A

Preparation of Multiple Addition, Difunctionally Coupled Copolymers

| Run No. | CyC$_6$ (cm$^3$) | S Component First (g) | (cm$^3$) | Second (g) | (cm$^3$) | THF (g) | Effective BuLi First (cm$^3$) | Second (cm$^3$) | B component (g) | (cm$^3$) | Ethyl Acetate (g) | Comments |
|---|---|---|---|---|---|---|---|---|---|---|---|---|
| 1 | 485 | 26 | 28.5 | 24 | 26.5 | 0.067 | 1.24 | 2.70 | 17 | 28 | 0.062 | |
| 2 | 485 | 27.7 | 30.4 | 22.6 | 24.8 | 0.034 | 1.20 | 2.66 | 17 | 28 | 0.062 | |
| 3 | 485 | 29.4 | 32.3 | 21 | 23.1 | 0.034 | 1.09 | 2.78 | 17 | 28 | 0.062 | |
| 4 | 485 | 30.1 | 33.1 | 19.9 | 21.9 | 0.034 | 0.97 | 2.97 | 17 | 28 | 0.062 | |
| 5 | 485 | 30.1 | 33.1 | 19.9 | 21.9 | 0.034 | 0.97 | 2.97 | 17 | 28 | 0.062 | Duplicate of run 4 |
| 6 | 485 | 31.5 | 34.6 | 18.5 | 20.3 | 0.034 | 0.82 | 3.10 | 17 | 28 | 0.062 | |
| 7 | 485 | 31.5 | 34.6 | 18.5 | 20.3 | 0.034 | 0.82 | 3.10 | 17 | 28 | 0.062 | Multiple bottle prep using recipe of run 6 |
| 8 | 485 | 33.0 | 36.3 | 17.0 | 18.7 | 0.034 | 0.72 | 3.23 | 17 | 28 | 0.062 | |
| 9 | 485 | 34.5 | 38 | 15.5 | 17 | 0.067 | 0.64 | 3.30 | 17 | 28 | 0.062 | |

Two runs were conducted in a 5 gallon (0.02 m$^3$) stainless steel reactor. The following quantities of reactants and conditions were employed:

| | Run 10 | Run 11 |
|---|---|---|
| First charge: | | |
| cyclohexane | 14.7 lbs (6.7 kg) | 14.7 lbs (6.7 kg) |
| tetrahydrofuran | 0.84 cm$^3$ | 0.84 cm$^3$ |
| styrene | 1.59 kg | 1.59 kg |
| n-butyllithium (as solution in cyclohexane) | 0.90 g | 0.87 g |
| initial temperature | 107° F (42° C) | 110° F (43° C) |
| polymerization time, minutes | 37 | 44 |
| Second charge: | | |
| cyclohexane | 0.3 lb (0.14 kg) | 0.3 lb (0.14 kg) |
| n-butyllithium | 3.6 g | 3.1 g |
| styrene | 0.69 kg | 0.69 kg |
| initial temperature | 156° F (69° C) | 166° F (74° C) |
| polymerization time, minutes | 24 | 21 |
| Third charge: | | |
| cyclohexane | 0.1 lb (0.045 kg) | 0.1 lb (0.045 kg) |
| butadiene | 0.72 kg | 0.72 kg |
| initial temperature | 161° F (72° C) | 166° F (74° C) |
| polymerization time, minutes | 21 | 20 |
| Fourth charge: | | |
| cyclohexane | 0.2 lb (0.09 kg) | 0.2 lb (0.09 kg) |
| ethyl acetate in CyC$_6$ (0.019 g/cm$^3$) | 31 cm$^3$ | 28 cm$^3$ |
| initial temperature | 216° F (102° C) | 218° F (103° C) |
| reaction time, minutes | 20 | 20 |

Each polymer solution was treated with 6 cm$^3$ water and the reactor pressured up to 110 psig (758 kPa gage) with carbon dioxide to improve the color of the polymer. Run 10 was $CO_2$ treated 20 minutes at 216° F. (102° C.) and run 11 was $CO_2$ treated 30 minutes at 216° F. also. A 50 wt. % stabilizer solution containing tris (nonylphenyl)phosphite and 2,6-di-t-butyl-4-methylphenol dissolved in cyclohexane was then added to each polymer solution such that 1.5 parts by weight phosphite per 100 parts by weight total monomers (phm) and 0.5 phm was present. Each polymer solution was flashed at 332° F. (167° C.) to remove solvent.

The physical properties of the polymers are presented in Table II B. A general discussion of the test results is given following Table III C.

Table II B

Properties of Multiple Addition, Difunctionally Coupled Copolymers

| Run No. | Melt Flow (g/10 min) | High MW Fraction Block MW × 10$^{-3}$ S | B | Wt. % | Low MW Fraction Block MW × 10$^{-3}$ S | B | Wt. % | Calculated Styrene Block, HI | Vibron Results Tanδ Max. | T° C (Tan δ) Max.) | Tg (° C) | Falling Dart Impact (in-lbs) | Joules | Elong % | Remarks |
|---|---|---|---|---|---|---|---|---|---|---|---|---|---|---|---|
| 1 | 14.7 | 75 | 12 | 58 | 17 | 12 | 42 | 1.6 | 0.026 | −88 | −91 | <10 | <1.13 | 8 | control |
| 2 | nd | .80 | 12 | 60 | 16 | 12 | 40 | 1.7 | nd | nd | nd | <10 | <1.13 | 12 | control |
| 3 | nd | 90 | 12 | 60 | 15 | 12 | 40 | 1.9 | nd | nd | nd | <10 | <1.13 | 18 | control |
| 4 | nd | 100 | 12 | 58 | 14 | 12 | 42 | 2.1 | nd | nd | nd | 12.4 | 1.40 | 8 | control |
| 5 | 25.4 | 100 | 12 | 58 | 14 | 12 | 42 | 2.1 | 0.113 | −82 | −91 | nd | nd | nd | control |
| 6 | 18.2 | 120 | 12 | 58 | 13 | 12 | 42 | 2.5 | 0.196 | −83 | −88 | nd | nd | nd | invention |
| 7 | nd | 120 | 12 | 58 | 13 | 12 | 42 | 2.5 | nd | nd | nd | 78.6 | 8.87 | 8 | invention |
| 8 | 16.1 | 140 | 12 | 58 | 12 | 12 | 42 | 2.9 | 0.097 | −80 | −88 | nd | nd | nd | invention |
| 9 | 12.8 | 160 | 12 | 58 | 11 | 12 | 42 | 3.4 | 0.073 | −74 | −85 | >80 | >9.0 | 193 | invention |
| 10 | 7.4 | 180 | 11 | 60 | 10.5 | 11 | 40 | 3.9 | nd | nd | nd | >80 | >9.0 | 174 | invention |
| 11 | 3.6 | 190 | 11 | 60 | 12 | 11 | 40 | 3.7 | nd | nd | nd | 48.3 | 5.86 | 84 | invention |

This example shows surprisingly that high impact linear compositions can be obtained by multiple addition of the styrene monomer and catalyst followed by coupling to give a product with about a 2.3 to 4.5 heterogeneity index for the polymerized styrene blocks. The impact values of 48.3 to >80 for the linear polymer of invention Runs 7, 9, 10 and 11 compares favorably with the best of the radial polymers as exemplified by control Run 4 of Example I and represents a dramatic improvement compared with linear polymer having a heterogeneity index below 2.4 as by control Runs 1–3 as well as a dramatic improvement compared with ordinary radial polymer as exemplified by control Run 3 of Example I. While impact was not determined on Runs 6 and 8, these runs exhibited a temperature of tangent δ maximum and tangent δ maximum associated with high impact strength as discussed in connection with Example III hereinbelow.

EXAMPLE III

Polymers made according to technique three, previously described wherein the order of addition was styrene, initiator, butadiene, coupling agent, were prepared by conducting a series of individual polymerizations to form diblock polymers each of which was coupled with ethyl acetate as the difunctional coupling agent. The resulting solutions were mixed as shown in Tables III A and III B to form a mixture. Each mixture was treated with stabilizer solution as previously described, recovered by devolatilization in vacuo at 100° C. for the bottle samples or by flashing at 332° F. (167° C.) to remove solvent for the larger preparations.

The preparation details are presented in Tables III A and B.

Table III A

Preparation of Individual Diblock, Difunctionally Coupled Copolymers

| Run No. | CyC$_6$ (cm$^3$) | S Component (g) | (cm$^3$) | THF (g) | Effective BuLi (cm$^3$) | B Component (g) | (cm$^3$) | Ethyl Acetate (g) | Comments |
|---|---|---|---|---|---|---|---|---|---|
| 1 | 325 | 34 | 37.7 | 0.023 | 0.63 | 11 | 18.2 | 1.0 | |
| 2 | 220 | 22.5 | 24.9 | .015 | 4.47 | 7.5 | 12.3 | 6.6 | |
| 3 | 325 | 34 | 37.7 | 0.023 | 0.63 | 11 | 18.2 | 1.0 | Run 1 duplicate |
| 4 | 220 | 22.5 | 24.9 | .015 | 4.47 | 7.5 | 12.3 | 6.6 | Run 2 duplicate |
| 5 | 325 | 34 | 37.7 | 0.023 | 0.94 | 11 | 18.2 | 1.5 | |
| 6 | 220 | 22.5 | 24.9 | .015 | 4.47 | 7.5 | 12.3 | 6.6 | |
| 7 | 325 | 36.3 | 39.9 | .023 | 0.49 | 8.7 | 14.3 | 0.29 | |
| 8 | 220 | 19.9 | 21.9 | .015 | 1.83 | 10.1 | 16.6 | 1.33 | |
| 9 | 325 | 37.5 | 41.2 | .023 | 0.30 | 7.5 | 12.3 | 0.30 | |
| 10 | 220 | 18.8 | 20.7 | .015 | 1.75 | 11.2 | 18.5 | 1.25 | |
| 11 | 325 | 38.8 | 42.6 | .023 | 0.31 | 6.2 | 10.2 | 0.31 | |
| 12 | 220 | 17.5 | 19.2 | .015 | 1.67 | 12.5 | 20.6 | 1.17 | |
| 13 | 325 | 40.9 | 45.0 | .023 | 0.33 | 4.1 | 6.8 | 0.33 | |
| 14 | 220 | 15.4 | 16.9 | .015 | 1.53 | 14.6 | 24.0 | 1.03 | |
| 15 | 295 | 37.4 | 41.5 | .020 | 0.79 | 3.2 | 5.3 | 0.25 | |
| 16 | 250 | 18.9 | 21.0 | .017 | 3.70 | 15.6 | 25.9 | 1.26 | |
| 17 | 295 | 37.0 | 41.0 | .020 | 0.60 | 2.8 | 4.7 | 0.22 | |
| 18 | 250 | 19.3 | 21.4 | .018 | 3.75 | 16.0 | 26.5 | 1.28 | |
| 19 | 295 | 40.9 | 45.0 | .023 | 0.91 | 4.1 | 6.8 | 0.33 | |
| 20 | 250 | 15.4 | 16.9 | .015 | 3.06 | 14.6 | 24.0 | 1.03 | |

Table III B

Preparation of Individual Diblock, Difunctionally Coupled Copolymers in a Stirred Reactor

| Run No. | CyC$_6$ (Pounds) | (kg) | S Component (kg) | THF (cm$^3$) | Effective BuLi (g) | B Component (kg) | Ethyl Acetate (cm$^3$) |
|---|---|---|---|---|---|---|---|
| 21 | 9.4 | 4.3 | 1.254 | 0.40 | 0.93 | 0.171 | 6.4 |
| 22 | 7.1 | 3.2 | 0.624 | 0.31 | 2.97 | 0.451 | 20.0 |
| 23 | 8.9 | 4.0 | 1.161 | 0.38 | 0.63 | 0.189 | 4.4 |
| 24 | 7.6 | 3.4 | 0.725 | 0.32 | 3.10 | 0.425 | 21.0 |
| 25 | 9.4 | 4.3 | 1.254 | 0.41 | 0.67 | 0.171 | 4.6 |
| 26 | 7.1 | 3.2 | 0.624 | 0.31 | 2.66 | 0.451 | 18.0 |
| 27 | 9.9 | 4.5 | 1.335 | 0.42 | 0.92 | 0.165 | 6.9 |
| 28 | 6.6 | 3.0 | 0.550 | 0.28 | 2.33 | 0.450 | 16.0 |
| 29 | 8.9 | 4.0 | 1.242 | 0.38 | 0.52 | 0.108 | 4.1 |
| 30 | 7.6 | 3.4 | 0.621 | 0.32 | 2.68 | 0.529 | 18.4 |

Table III C

Properties of Blends of Resinous Copolymers

| Combined Runs of Table III A or B | New Run No. | Melt Flow (g/10 min) | High MW Fraction Block MW × 10$^{-3}$ S | B | S | Wt. % | Low MW Fraction Block MW × 10$^{-3}$ S | B | S | Wt. % | Calculated Styrene Block, HI | Vibron Results Tanδ Max. | T° C (Tan δ) Max.) | Falling Dart Impact (in-lbs) | Joules | Elong % | Remarks |
|---|---|---|---|---|---|---|---|---|---|---|---|---|---|---|---|---|---|
| 1 & 2 | 1 | 3.8 | 150 | 100 | 150 | 60 | 15 | 10 | 15 | 40 | 2.9 | 0.028 | −88 | nd | nd | nd | control |
| 3 & 4 | 2 | 14.0 | 150 | 100 | 150 | 60 | 15 | 10 | 15 | 40 | 2.9 | nd | nd | 15.7 | 1.76 | nd | control |
| 5 & 6 | 3 | 9.9 | 100 | 67 | 100 | 60 | 15 | 10 | 15 | 40 | 2.2 | 0.026 | −92 | nd | nd | nd | control |
| 7 & 8 | 4 | 0.24 | 350 | 170 | 350 | 60 | 42 | 42 | 42 | 40 | 2.5 | 0.044 | −90 | nd | nd | nd | control |
| 9 & 10 | 5 | 0.30 | 350 | 140 | 350 | 60 | 42 | 50 | 42 | 40 | 2.4 | 0.036 | −92 | nd | nd | nd | control |
| 23 & 24 | 6 | 5.1 | 150 | 48 | 150 | 54 | 16 | 18 | 16 | 46 | 2.8 | 0.036 | −87 | 13.5 | 1.53 | 12 | control |
| 11 & 12 | 7 | 0.34 | 350 | 110 | 350 | 60 | 42 | 60 | 42 | 40 | 2.4 | 0.036 | −92 | nd | nd | nd | control |
| 25 & 26 | 8 | 2.2 | 152 | 42 | 152 | 37 | 16 | 23 | 16 | 43 | 2.7 | 0.035 | −90 | 11.2 | 1.27 | 13 | control |
| 21 & 22 | 9 | 7.3 | 103 | 28 | 103 | 57 | 14 | 20 | 14 | 43 | 2.2 | 0.036 | −86 | 12.4 | 1.40 | 9 | control |
| 29 & 30 | 10 | 2.1 | 204 | 35 | 204 | 54 | 16 | 26 | 16 | 46 | 3.3 | 0.131 | −84 | 48.3 | 5.86 | 76 | invention |
| 15 & 16 | 11 | 7.5 | 150 | 25 | 150 | 54 | 15 | 25 | 15 | 46 | 2.8 | 0.078 | −80 | nd | nd | nd | invention |
| 17 & 18 | 12 | 3.0 | 170 | 25 | 170 | 53 | 15 | 25 | 15 | 47 | 3.1 | 0.076 | −80 | nd | nd | nd | invention |
| 27 & 28 | 13 | 4.2 | 100 | 25 | 100 | 60 | 16 | 26 | 16 | 40 | 2.0 | 0.034 | −88 | 11.2 | 1.27 | 13 | control |
| 13 & 14 | 14 | 0.28 | 350 | 70 | 350 | 60 | 42 | 78 | 42 | 40 | 2.3 | 0.037 | −92 | nd | nd | nd | borderline |
| 19 & 20 | 15 | 2.1 | 125 | 25 | 125 | 60 | 15 | 29 | 15 | 40 | 2.3 | 0.065 | −85 | nd | nd | nd | invention |

The magnitude and temperature of the tan δ maximum corresponding to the glass transition temperature of the polybutadiene blocks are used as critera of polymer morphology. Samples exhibiting high tan δ max values, i.e., from about 0.045 up to about 0.200 or more along with T(tan δ max) values ranging from about −87° to about −75° C. are shown in the tables to have good impact properties as determined by the falling dart tests. Such samples have impact values in the dart test ranging from about 20 in-lbs to greater than 80 in-lbs (the limit of the test). Micrographs taken of several radial polymers made using multiple styrene and initiator addition as is exemplified in control Run 4, Table I B, having a tan δ max of 0.149, T(tan δ max) of −78° C., dart impact of 53.0 in-lbs and HI of 3.0 are shown to possess lamellar morphology. Such polymers have alternating layers of polybutadiene and polystyrene. Since the invention samples have high test values for the criteria described above it is reasoned that they all exhibit lamellar morphology.

On the other hand ordinary radial polymers are illustrative of copolymers exhibiting good but not outstanding impact values; control Run 3, Table I B is an example. This sample has a tan δ max of 0.027, a T(tan δ max) of −93° C., a dart impact of <10 in-lbs and a HI of 1.0. Micrographs taken of similar ordinary radial polymers show them to possess a spherical morphology in which spheres of polybutadiene are embedded inn a continuum of polystyrene. On impact, the polystyrene phases takes most of the load, hence relatively low impact values are to be expected which correlate with the Vibron results.

Inspection of the data presented in Table III C, shows that some polymer mixtures exhibiting a styrene block HI index in the desired range of about 2.3 to about 3.9 do not appear to have lamellar morphology based on low impact values, and/or low tan δ max values. The polymers of Runs 1, 2, and 4–8 illustrate this. It should be noted that the polymer mixture of Run 6 also possesses a T(tan δ max) of −87° C. which is in the desired range. This is because in mixtures of polymers another requirement is also needed, namely, that the butadiene blocks of each polymer in the mixture have similar enough molecular weights to be compatible. In Runs 1, 2, and 4–8, the difference between the molecular weights of the butadiene block ranges from about 19,000 to about 128,000. The incompatibility apparently influences the morphology of the mixed polymers, thus the desired lamellar morphology is not realized and relatively low impact values are found in molded articles made from these polymer blends. It is thought that these polymer blends may exhibit cylindrical morphology, i.e., cylinders of butadiene blocks in a continuum of styrene blocks.

Invention Runs 10, 11, 12 and 15 of Table III C meet all the desired criteria including compatibility of butadiene blocks. Run 14 is on the borderline between those blends that have the greatly improved impact strength and those that do not. The difference in molecular weights of the butadiene blocks in these blends ranges from about 0 to about 9,000. Thus, for a final criterion, the molecular weight difference between butadiene blocks of mixed linear polymers (blends) should be less than about 10,000.

While this invention has been described in detail for the purpose of illustration it is not to be construed as limited thereby but is intended to cover all changes and modifications within the spirit and scope thereof.

That which is claimed is:

1. A linear resinous monovinyl-substituted aromatic compound/conjugated diene block copolymer composition characterized by having polymerized monovinyl-substituted aromatic compound blocks with a heterogeneity index within the range of 2.3 to 4.5.

2. A composition according to claim 1 wherein said monovinyl-substituted aromatic compound is styrene and said conjugated diene is butadiene and said heterogeneity index is within the range of 2.4 to 4.5.

3. A composition according to claim 2 wherein said block copolymer is produced by introducing initiator and said styrene in at least two increments prior to introduction of said butadiene.

4. A composition according to claim 2 wherein said block copolymer is produced by introducing initiator and said styrene in at least two increments prior to introducing said butadiene and thereafter coupling the resulting polymerized styrene-polymerized butadiene blocks with a difunctional coupling agent.

5. A composition according to claim 2 produced by blending two linear block copolymers wherein a polymerized butadiene block of each of the components constituting said blend has a molecular weight such that a difference between the number average molecular weights of said polymerized butadiene blocks is less than 10,000.

6. A composition according to claim 2 having a falling dart impact strength of greater than 20 in-lbs.

7. A resinous composition produced by introducing a monovinyl-substituted aromatic compound and an initiator into a polymerization zone, thereafter introducing at least one additional increment of said monovinyl-substituted aromatic compound and said initiator, thereafter introducing a conjugated diene, and thereafter introducing additional monovinyl-substituted aromatic compound, said resulting composition having a heterogeneity index of polymerized monovinyl-substituted aromatic compound blocks within the range of 2.3 to 4.5.

8. A composition according to claim 7 wherein said monovinyl-substituted aromatic compound is styrene, said conjugated diene is butadiene, and said initiator is an organolithium compound.

9. A resinous composition prepared by introducing into a polymerization zone a monovinyl-substituted aromatic compound and an initiator; after said monovinyl-substituted aromatic compound has been substantially all polymerized introducing at least one additional increment of monovinyl-substituted aromatic compound and initiator; after said additional monovinyl-substituted aromatic compound has been essentially all polymerized introducing a conjugated diene monomer; after said conjugated diene monomer has been essentially all polymerized introducing a difunctional coupling agent; said composition being characterized by polymerized monovinyl-substituted aromtic compound blocks having a heterogeneity index within the range of 2.3 to 4.5.

10. A composition according to claim 9 wherein said monovinyl-substituted aromatic compound is styrene, said conjugated diene is butadiene, and said initiator is an organolithium compound.

11. A resinous composition prepared by blending two copolymers each of which is produced by introducing a monovinyl-substituted aromatic compound and an initiator into a polymerization zone; after said monovinyl-substituted aromatic compound is essentially all polymerized introducing at least one additional increment of said monovinyl-substituted aromatic compound and said initiator; after said additional monovinyl-substituted aromatic compound is essentially all polymerized introducing a conjugated diene; after said conjugated diene is essentially all polymerized introducing a difunctional coupling agent, said composition being characterized by polymerized monovinyl-substituted aromatic compound blocks having a heterogeneity index within the range of 2.3 to 4.5.

12. A composition according to claim 11 wherein said monvinyl-substituted aromatic compound is styrene, said conjugated diene is butadiene, said initiator is an organolithium compound, and polymerized blocks of said butadiene in each of the components constituting said blend have a molecular weight such that the difference between the number average molecular weights of said polymerized butadiene blocks in said components is less than 10,000.

13. A resinous composition prepared by blending two polymers each of which is produced by introducing a monovinyl-substituted aromatic compound and an initiator into a polymerization zone; after said polymerization is essentially complete introducing at least one additional increment of said monovinyl-substituted aromatic compound and said initiator; after the polymerization of said second increment of monovinyl-substituted aromatic compound is essentially complete introducing a conjugated diene; after the polymerization of said conjugated diene is essentially complete introducing another increment of said monovinyl-substituted aromatic compound, the resulting blend being characterized by polymerized monovinyl-substituted aromatic compound blocks having a heterogeneity index within the range of 2.3 to 4.5.

14. A composition according to claim 13 wherein said monovinyl-substituted aromatic compound is styrene, said conjugated diene is butadiene, said initiator is an organolithium compound and blocks of polymerized diene in each of said components constituting said blend have a molecular weight such that the difference between the number average molecular weight of said polymerized butadiene blocks in each of said components is less than 10,000.

15. A resinous composition comprising a blend of two polymers each produced by introducing a monovinyl-substituted aromatic compound and an initiator into a polymerization zone; after the polymerization of said monovinyl-substituted aromatic compound is essentially complete introducing a conjugated diene into said polymerization zone; after the polymerization of said conjugated diene is essentially complete introducing another increment of said monovinyl-substituted aromatic compound, the resulting blend being characterized by polymerized monovinyl-substituted aromatic compound blocks having a heterogeneity index within the range of 2.3 to 4.5.

16. A composition according to claim 15 wherein said monovinyl-substituted aromatic compound is styrene, said conjugated diene is butadiene, said initiator is an organolithium compound, and blocks of polymerized butadiene in each of said compounds constituting said blend have a molecular weight such that the difference between number average molecular weight of said butadiene blocks in each of said components constituting said blend differ from each other by less than 10,000.

17. A resinous composition comprising a blend of at least two polymers each of which is produced by introducing a monovinyl-substituted aromatic compound and an initiator into a polymerization zone; after the polymerization of said monovinyl-substituted aromatic compound is essentially complete introducing a conjugated diene; after the polymerization of said conjugated diene is essentially complete introducing a difunctional coupling agent, the resulting blend being characterized by polymerized monovinyl-substituted aromatic compound blocks having a heterogeneity index within the range of 2.3 to 3.9.

18. A composition according to claim 17 wherein said monovinyl-substituted aromatic compound is styrene, said diene is butadiene, said initiator is an organolithium compound, and wherein blocks of polymerized butadiene in each of the components constituting said blend have a molecular weight such that the difference in the number average molecular weight of the butadiene block of said components is less than 10,000.

* * * * *